United States Patent
Wang et al.

(10) Patent No.: US 12,482,817 B1
(45) Date of Patent: Nov. 25, 2025

(54) ZINC POWDER ANODE MATERIAL, PREPARATION METHOD THEREFORE, AND ZINC-ION BATTERY

(71) Applicant: Shenzhen North University Moscow University, Guangdong (CN)

(72) Inventors: Jingwei Wang, Guangdong (CN); Shukui Li, Guangdong (CN); Junye Cheng, Guangdong (CN)

(73) Assignee: Shenzhen North University Moscow University, Shenzhen (CN)

( * ) Notice: Subject to any disclaimer, the term of this patent is extended or adjusted under 35 U.S.C. 154(b) by 0 days.

(21) Appl. No.: 19/080,773

(22) Filed: Mar. 14, 2025

(30) Foreign Application Priority Data

Jul. 9, 2024 (CN) .......................... 202410911708.6

(51) Int. Cl.
| | | |
|---|---|---|
| *H01M 4/36* | (2006.01) |
| *H01M 4/02* | (2006.01) |
| *H01M 4/38* | (2006.01) |
| *H01M 4/62* | (2006.01) |
| *H01M 10/054* | (2010.01) |

(52) U.S. Cl.
CPC ............. *H01M 4/366* (2013.01); *H01M 4/38* (2013.01); *H01M 4/624* (2013.01); *H01M 10/054* (2013.01); *H01M 2004/021* (2013.01)

(58) Field of Classification Search
None
See application file for complete search history.

(56) References Cited

U.S. PATENT DOCUMENTS

| | | | | |
|---|---|---|---|---|
| 2012/0328923 A1* | 12/2012 | Sawai | ................... | H01M 4/625 977/734 |
| 2013/0115495 A1* | 5/2013 | Tahara | ................... | H01M 6/16 429/211 |
| 2023/0146748 A1* | 5/2023 | Alvarez | ............... | H01M 4/662 429/235 |

FOREIGN PATENT DOCUMENTS

| | | | |
|---|---|---|---|
| CN | 116314680 A | 6/2023 | |
| CN | 118016867 A | 5/2024 | |
| JP | 2006106208 A | 4/2006 | |
| WO | WO-2007095454 A2 * | 8/2007 | ............. A01N 25/28 |

OTHER PUBLICATIONS

Machine translation of CN 118016867 A, published on May 10, 2024 (Year: 2024).*

* cited by examiner

*Primary Examiner* — Anca Eoff

(57) ABSTRACT

Disclosed are a zinc powder anode material, a preparation method therefor, and a zinc-ion battery, which relate to the technical field of batteries. The preparation method for a zinc powder anode material includes the following steps: providing zinc powder and a conductive material; dispersing zinc powder and a conductive material in a solvent to obtain a mixed solution; performing ball milling of the mixed solution; transferring the ball-milled mixed solution to a sealed container, heating same to a target temperature, stopping heating, introducing carbon dioxide into the sealed container, stopping introducing carbon dioxide when a pressure in the sealed container reaches a target pressure, and leaving same to stand for preset time, where carbon dioxide reaches a supercritical state at the target pressure and the target temperature; and sequentially performing depressurizing, cooling, coating, and drying to obtain a zinc powder anode material.

6 Claims, No Drawings

ZINC POWDER ANODE MATERIAL, PREPARATION METHOD THEREFORE, AND ZINC-ION BATTERY

CROSS-REFERENCE TO RELATED APPLICATION

This application claims priority of Chinese Patent Application No. 202410911708.6, filed on Jul. 9, 2024, the entire contents of which are incorporated herein by reference.

TECHNICAL FIELD

The present disclosure relates to the technical field of batteries, and in particular to a zinc powder anode material, a preparation method therefor, and a zinc-ion battery.

BACKGROUND

Safety of energy storage devices in a new energy vehicle is crucial. An aqueous zinc-ion battery has inherent advantages such as a low cost, safety, environmental friendliness, a high theoretical capacity of zinc metal (820 mAh $g^{-1}$), a low redox potential (−0.76 V (a neutral or weakly acidic electrolyte) and −1.21 V (an alkaline electrolyte) relative to a standard hydrogen electrode), and abundant reserves, thereby becoming a most ideal choice for large-scale energy storage. However, during an actual application of the aqueous zinc-ion battery, a zinc anode is affected by a series of phenomena such as self-corrosion side reactions, zinc dendrite growth, hydrogen evolution reactions and the like.

At present, zinc foil is usually used as an anode material. However, during the application thereof, zinc dendrite growth in zinc foil is relatively uncontrollable, and a zinc utilization rate is relatively low.

SUMMARY

A main objective of the present disclosure is to provide a zinc powder anode material, a preparation method therefor, and a zinc-ion battery, with an aim to inhibit side reactions such as zinc dendrite growth and hydrogen evolution and improve a zinc utilization rate.

To achieve the above objective, the present disclosure provides a preparation method for a zinc powder anode material, and the preparation method includes the following steps:
  providing zinc powder and a conductive material;
  dispersing the zinc powder and the conductive material in a solvent to obtain a mixed solution;
  performing ball milling of the mixed solution;
  transferring the ball-milled mixed solution to a sealed container, heating same to a target temperature, stopping heating, introducing carbon dioxide into the sealed container, stopping introducing carbon dioxide when a pressure in the sealed container reaches a target pressure, and leaving same to stand for preset time, wherein carbon dioxide reaches a supercritical state at the target pressure and the target temperature; and
  sequentially performing depressurizing, cooling, coating, and drying to obtain the zinc powder anode material.

In an example, a mass ratio of the zinc powder to the conductive material is (90-99):(1-10). In an example, the conductive material is one or more of poly (3,4-ethylenedioxythiophene), polypyrrole, polyaniline, polyacetylene, polyphenylacetylene, carbon black, a carbon nanotube, and graphene; and/or, The solvent is at least one of anhydrous ethanol, water, N-methylpyrrolidone and acetonitrile.

In an example, an average particle size of the zinc powder is 0.1-25 μm.

In an example, in the step of performing ball milling of the mixed solution, ball milling time is 0.1-5 h; and a particle size of ball-milled solid in the mixed solution is less than 500 nm.

In an example, the target temperature is 40-50° C., and the target pressure is 7.5-10 MPa.

In an example, the preset time is 1-3 h.

The present disclosure further provides a zinc powder anode material, and the zinc powder anode material is prepared by using the above preparation method for a zinc powder anode material.

In an example, the zinc powder anode material includes zinc powder and a coating layer coated on a surface of the zinc powder, and the coating layer is made of a conductive material; and a thickness of the coating layer is 5-20 nm.

The present disclosure further provides a zinc-ion battery, and the zinc-ion battery includes an anode made of the above zinc powder anode material.

The preparation method for a zinc powder anode material provided by the present disclosure includes the following steps: firstly dispersing zinc powder and a conductive material in a solvent to obtain a mixed solution, then performing ball milling of the mixed solution, transferring the ball-milled mixed solution to a sealed container, heating same to a target temperature, introducing carbon dioxide into the sealed container, stopping introducing carbon dioxide when a pressure in the sealed container reaches a target pressure, and leaving same to stand for preset time, where in this case, carbon dioxide reaches a supercritical state at the target pressure and the target temperature, and by means of a physicochemical action of supercritical carbon dioxide fluid, a surface of the zinc powder is fully infiltrated, which facilitates more uniform coating of the conductive material on the surface of the zinc powder; and sequentially performing depressurizing, cooling, coating, and drying to obtain a zinc powder anode material. The zinc powder anode material uniformly coated with the conductive material prepared by means of the physicochemical action of the supercritical carbon dioxide fluid in the present disclosure is capable of effectively inhibiting the side reactions such as zinc dendrite growth and hydrogen evolution, improving the zinc utilization rate, and enhancing electrochemical stability of zinc metal; and further, the preparation thereof is relatively simple and practicable, with a relatively low cost.

DETAILED DESCRIPTIONS OF THE EMBODIMENTS

It should be understood that specific examples described herein are merely used to explain the present disclosure, and are not used to limit the present disclosure.

In order to make the objectives, technical solutions and advantages of the examples of the present disclosure clearer, the technical solutions in the examples of the present disclosure will be clearly and completely described. If specific conditions are not specified in the examples, conventional conditions or conditions recommended by the manufacturer shall prevail. If the manufacturers of reagents or instruments used are not specified, they are all conventional products commercially available from the market. Moreover, "and/or" in the full text means including three parallel schemes, e.g., "A and/or B" includes a scheme A, or a scheme B, or a scheme where both A and B are satisfied simultaneously. Further, the technical solutions between various examples of the present disclosure may be combined with one another on the basis that they may be implemented by those of ordinary skill in the art. When leading to contradiction or failing in implementation, the combination between the technical solutions should be deemed non-existent, and falls outside the scope of protection of the present disclosure. Based on the described examples of the present disclosure, all other examples acquired by those of ordinary skill in the art without making creative efforts fall within the protection scope of the present disclosure.

It should be noted that, the terms "including", "containing" or any other variants thereof are intended to cover non-exclusive inclusion, such that a process, method, article or system including a series of elements not only includes those elements, but also includes those elements that are not explicitly listed, or also includes elements inherent to the process, method, article or system. Without more restrictions, the elements defined by the sentence "including a . . . " do not exclude the existence of other identical elements in the process, method, article, or system including the elements.

In order to solve the technical problems of the prior art including relatively uncontrollable zinc dendrite growth in zinc foil and a relatively low zinc utilization rate that occur during an application of zinc foil as an anode material, the present disclosure provides a preparation method for a zinc powder anode material, with an aim to inhibit side reactions such as zinc dendrite growth and hydrogen evolution and improve a zinc utilization rate.

In an example of the present disclosure, the preparation method for a zinc powder anode material includes the following steps:

S1, provide zinc powder and a conductive material.

In a specific example of the present disclosure, the zinc powder provided can be flaky zinc powder or spherical zinc powder, or zinc powder of any other shape, without details described herein; and the zinc powder is purchased from the market, and optionally, an average particle size of the zinc powder is 0.1-25 μm (such as 0.1 μm, 1 μm, 5 μm, 10 μm, 15 μm, 20 μm, 25 μm, or any value of an interval between any two end points). The conductive material can be one or more of poly (3,4-ethylenedioxythiophene) (PEDOT), polypyrrole (PPY), polyaniline (PANI), polyacetylene, polyphenylacetylene, carbon black, a carbon nanotube, and graphene.

S2, disperse the zinc powder and the conductive material in a solvent to obtain a mixed solution.

In a specific example of the present disclosure, a mass ratio of the zinc powder to the conductive material is (90-99):(1-10), e.g., the mass ratio can be 90:10, 92:8, 94:6, 96:4, 98:2, 99:1 or any value of an interval between any two end points. At the above mass ratio, relatively uniform coating of the conductive material on a surface of the zinc powder can be achieved. The solvent can be at least one of anhydrous ethanol, water, N-methylpyrrolidone and acetonitrile, specifically depending on practical operations; and an amount of the solvent depends on practical operations, as long as a uniformly dispersed mixed solution (in a slurry form) can be obtained. It should be noted that when the conductive material is solid, a relatively larger amount of the solvent is used, and when the conductive material is liquid, a relatively smaller amount of the solvent is used.

S3, perform ball milling of the mixed solution.

In a specific example of the present disclosure, the mixed solution is added to a ball milling jar for ball milling for some time, and optionally, ball milling time is 0.1-5 h (such as 0.1 h, 0.5 h, 1 h, 1.5 h, 2 h, 2.5 h, 3 h, 3.5 h, 4 h, 4.5 h, 5 h or any value of an interval between any two end points). A particle size of solid in the mixed solution obtained by means of the above ball milling is less than 50 nm. In this example, the mixed solution is ball milled to reduce the particle size of the solid therein, which facilitates more uniform coating of the conductive material on the surface of the zinc powder, where a smaller particle size of the zinc powder contributes to a relatively high zinc utilization rate and electrochemical stability.

S4, transfer the ball-milled mixed solution to a sealed container, heat same to a target temperature, stop heating, introduce carbon dioxide into the sealed container, stop introducing carbon dioxide when a pressure in the sealed container reaches a target pressure, and leave same to stand for preset time, where carbon dioxide reaches a supercritical state at the target pressure and the target temperature.

In a specific example of the present disclosure, the ball-milled mixed solution is transferred to a reaction kettle, the reaction kettle is heated, the heating is stopped when temperature reaches the target temperature, and carbon dioxide is introduced into the reaction kettle; as carbon dioxide is introduced, a pressure in the reaction kettle gradually increases, and when the pressure in the reaction kettle reaches the target pressure, the introduction of carbon dioxide is stopped, and the reaction kettle is left to stand for the preset time; at the target temperature and the target pressure, carbon dioxide is in the supercritical state, and by means of a physicochemical action of supercritical carbon dioxide fluid, the surface of the zinc powder is fully infiltrated, which facilitates more uniform coating of the conductive material on the surface of the zinc powder. It should be noted that a rate of heating the reaction kettle and a rate of introducing carbon dioxide are not defined herein.

Optionally, the target temperature is 40-50° C. (such as 40° C., 42° C., 45° C., 48° C., 50° C. or any value of an interval between any two end points), and the target pressure is 7.5-10 MPa (such as 7.5 MPa, 8 MPa, 8.5 MPa, 9 MPa, 9.5 MPa, 10 MPa or any value of an interval between any two end points); and the preset time is 1-3 h (such as 1 h, 2 h, 3 h or any value of an interval between any two end points).

S5, sequentially perform depressurizing, cooling, coating, and drying to obtain the zinc powder anode material.

In a specific example of the present disclosure, the depressurizing specifically includes: exhaust and depressurize the reaction kettle until the pressure approximates atmospheric pressure; the cooling specifically includes: naturally cool the reaction kettle to room temperature; the coating specifically includes: knife-coat the obtained slurry on carbon paper to form a film, where a thickness of the film is 10-15 μm (such as 10 μm, 11 μm, 12 μm, 13 μm, 14 μm, 15 μm or a value of an interval between any two end points); and the drying is specifically vacuum drying, drying temperature is 55-65° C. (such as 55° C., 58° C., 60° C., 62° C., 65° C. or a value of an interval between any two end points), and drying time is 4-8 h (such as 4 h, 5 h, 6 h, 7 h, 8 h or a value of an interval between any two end points).

The zinc powder anode material uniformly coated with the conductive material prepared by means of the physicochemical action of the supercritical carbon dioxide fluid in the present disclosure is capable of effectively inhibiting the side reactions such as zinc dendrite growth and hydrogen evolution, improving the zinc utilization rate, and enhancing electrochemical stability of zinc metal; and further, the preparation thereof is relatively simple and practicable, with a relatively low cost.

The present disclosure further provides a zinc powder anode material, and the zinc powder anode material is prepared by using the above preparation method for a zinc powder anode material.

The zinc powder anode material prepared by the present disclosure includes zinc powder and a coating layer coated on a surface of the zinc powder, where the coating layer is made of a conductive material. Since the zinc powder anode material is prepared by means of the above preparation method for a zinc powder anode material, the obtained zinc powder anode material is uniformly coated with the conductive material, which contributes to the relatively high zinc utilization rate and electrochemical stability.

Optionally, a thickness of the coating layer is 5-20 nm (such as 5 nm, 10 nm, 15 nm, 20 nm or a value of an interval between any two end points).

The present disclosure further provides a zinc-ion battery, and the zinc-ion battery includes an anode made of the above zinc powder anode material.

The zinc powder anode material, the preparation method therefor, and the zinc-ion battery of the present disclosure will be described in detail below through specific examples.

Example 1

A zinc powder anode material of this example is prepared by taking the following steps:
(1) uniformly disperse zinc powder with an average particle size of 6-15 µm and poly (3,4-ethylenedioxythiophene) in anhydrous ethanol at a mass ratio of 95:5 to obtain a mixed solution;
(2) add the mixed solution to a ball milling jar for ball milling for 2 h, transfer the ball-milled mixed solution to a reaction kettle, heat the reaction kettle, stop the heating when temperature reaches 50° C., introduce carbon dioxide into the reaction kettle, and when a pressure in the reaction kettle reaches 8 MPa, stop the introduction of carbon dioxide, and leave same to stand for 3 h.
(3) depressurize and cool the reaction kettle, take out slurry, knife-coat the obtained slurry on carbon paper to form a film with a thickness of 15 µm, and then perform vacuum drying at 60° C. for 6 h to obtain the zinc powder anode material.

Example 2

The difference between this example and Example 1 only lies in that a mass ratio of zinc powder to PEDOT is 90:10, while all other operations are the same as those in Example 1.

Example 3

The difference between this example and Example 1 only lies in that a mass ratio of zinc powder to PEDOT is 99:1, while all other operations are the same as those in Example 1.

Example 4

The difference between this example and Example 1 only lies in that the raw material PEDOT is replaced by carbon black, and a mass ratio of zinc powder to carbon black is 90:10, while all other operations are the same as those in Example 1.

Example 5

The difference between this example and Example 1 only lies in that the raw material PEDOT is replaced by polypyrrole, and a mass ratio of zinc powder to polypyrrole is 96:4, while all other operations are the same as those in Example 1.

Example 6

The difference between this example and Example 1 only lies in that the raw material PEDOT is replaced by polyaniline, and a mass ratio of zinc powder to polyaniline is 94:6, while all other operations are the same as those in Example 1.

Example 7

The difference between this example and Example 1 only lies in that the raw material PEDOT is replaced by polyphenylacetylene, and a mass ratio of zinc powder to polyphenylacetylene is 92:8, while all other operations are the same as those in Example 1.

Example 8

The difference between this example and Example 1 only lies in that the raw material PEDOT is replaced by graphene, and a mass ratio of zinc powder to graphene is 90:10, while all other operations are the same as those in Example 1.

Example 9

The difference between this example and Example 1 only lies in that the raw material PEDOT is replaced by a carbon nanotube, and a mass ratio of zinc powder to the carbon nanotube is 90:10, while all other operations are the same as those in Example 1.

Example 10

The difference between this example and Example 1 only lies in that an average particle size of zinc powder is 15-25 µm, while all other operations are the same as those in Example 1.

Example 11

The difference between this example and Example 1 only lies in that an average particle size of zinc powder is 0.1-4 µm, while all other operations are the same as those in Example 1.

Example 12

The difference between this example and Example 1 only lies in that heating is stopped when the reaction kettle is heated to 40° C., while all other operations are the same as those in Example 1.

Example 13

The difference between this example and Example 1 only lies in that the introduction of carbon dioxide is stopped when a pressure in the reaction kettle reaches 9 MPa, while all other operations are the same as those in Example 1.

Comparative Example 1

The difference between this comparative example and Example 1 only lies in that a mass ratio of zinc powder to PEDOT is 80:20, while all other operations are the same as those in Example 1.

Comparative Example 2

The difference between this comparative example and Example 1 only lies in that the ball milling in the step (2) is omitted, while all other operations are the same as those in Example 1.

Comparative Example 3

The difference between this comparative example and Example 1 only lies in that the temperature after heating in the step (2) is 30° C. and carbon dioxide does not reach a supercritical state, while all other operations are the same as those in Example 1.

Comparative Example 4

The difference between this comparative example and Example 1 only lies in that the pressure after carbon dioxide is introduced in the step (2) is 6 MPa, and carbon dioxide does not reach a supercritical state, while all other operations are the same as those in Example 1.

The zinc powder anode materials prepared in the above Examples 1-11 and Comparative Examples 1-4 were applied to zinc-ion batteries and assembled into zinc/manganese dioxide batteries, a liquid zinc sulfate electrolyte was used for the cyclic stability tests, and a current density was set to 1.0 A g$^{-1}$ for the tests. A specific capacity of a battery was tested after 800 cycles, with test results shown in Table 1.

TABLE 1

Cyclic property test data of application of anode materials obtained in various examples and comparative examples to batteries

| | Specific capacity (mAh g$^{-1}$) |
|---|---|
| Example 1 | 210 |
| Example 2 | 201 |
| Example 3 | 216 |
| Example 4 | 203 |
| Example 5 | 207 |
| Example 6 | 205 |
| Example 7 | 204 |
| Example 8 | 202 |
| Example 9 | 203 |
| Example 10 | 192 |
| Example 11 | 212 |
| Example 12 | 215 |
| Example 13 | 219 |
| Comparative Example 1 | 158 |
| Comparative Example 2 | 146 |
| Comparative Example 3 | 67 |
| Comparative Example 4 | 68 |

It can be seen from the test data of Table 1 that in each example of the present disclosure, a zinc powder anode material uniformly coated with a conductive material is obtained by reasonably adjusting a mass ratio of zinc powder to the conductive material, selecting different types of conductive materials, optimizing and adjusting a particle size of zinc powder, and reasonably adjusting a heating temperature and pressure of the reaction kettle. After the zinc powder anode material is applied to a zinc-ion battery, the specific capacity thereof is tested after 800 cycles. Test results show that the battery exhibits a relatively large specific capacity after 800 cycles, and good electrochemical stability. As a heating temperature of the reaction kettle increases, some side reactions may occur between the solvent and the surface of the zinc powder, which affects the zinc utilization rate and electrochemical property, and after the obtained zinc powder anode material is applied to the zinc-ion battery, the specific capacity of the zinc-ion battery somewhat decreases after 800 cycles; and as a pressure in the reaction kettle increases, the zinc utilization rate and electrochemical property improve, and after the obtained zinc powder anode material is applied to the zinc-ion battery, the specific capacity of the zinc-ion battery somewhat increases after 800 cycles.

A comparison between Comparative Example 1 and Example 1 shows that when a mass ratio of zinc powder to a conductive material is less than 90:10, the specific capacity of cyclic test of the obtained zinc powder anode material applied to the zinc-ion battery decreases, indicating that when the mass ratio of the zinc powder to the conductive material is too small, the obtained zinc powder anode material cannot be uniformly coated by the conductive material, and both the zinc utilization rate and electrochemical property somewhat decline.

A comparison between Comparative Example 2 and Example 1 shows that when a mixed solution of zinc powder and a conductive material is not subjected to ball milling, the specific capacity of cyclic test of the obtained zinc powder anode material applied to the zinc-ion battery decreases, indicating that when the mixed solution of the zinc powder and the conductive material is not subjected to the ball milling, the obtained zinc powder anode material cannot be uniformly coated by the conductive material, and both the zinc utilization rate and electrochemical property somewhat decline.

A comparison between Comparative Examples 3-4 and Example 1 shows that when introduced carbon dioxide does not reach a supercritical state, the specific capacity of cyclic test of the obtained zinc powder anode material applied to the zinc-ion battery decreases, indicating that when the introduced carbon dioxide does not reach the supercritical state, a surface of the zinc powder cannot be fully infiltrated, the obtained zinc powder anode material cannot be uniformly coated by the conductive material, and both the zinc utilization rate and electrochemical property somewhat decline. The foregoing are merely preferred examples of the present disclosure and are not intended to limit the patent scope of the present disclosure. Any equivalent articles or equivalent process transformation made by using the description of the present disclosure, or directly or indirectly used in other related technical fields, are all similarly included in the scope of patent protection of the present disclosure.

The invention claimed is:
1. A preparation method for a zinc powder anode material, comprising the following steps:
providing zinc powder and a conductive material, wherein the conductive material is poly (3,4-ethylenedioxythiophene), and an average particle size of the zinc powder is 0.1-25 μm;

dispersing the zinc powder and the conductive material in a solvent to obtain a mixed solution; performing ball milling of the mixed solution;

transferring a ball-milled mixed solution to a sealed container, heating the ball-milled mixed solution to a target temperature, stopping heating, introducing carbon dioxide into the sealed container, stopping introducing carbon dioxide when a pressure in the sealed container reaches a target pressure, and leaving the ball-milled mixed solution to stand for a preset time, wherein carbon dioxide reaches a supercritical state at the target pressure and the target temperature; and sequentially performing depressurizing, cooling, coating, and drying to obtain the zinc powder anode material, wherein the zinc powder anode material comprises zinc powder and a coating layer coated on a surface of the zinc powder, and the coating layer is made of a conductive material.

2. The preparation method for a zinc powder anode material according to claim 1, wherein a mass ratio of the zinc powder to the conductive material is (90-99):(1-10).

3. The preparation method for a zinc powder anode material according to claim 1, wherein the solvent is at least one of anhydrous ethanol, water, N-methylpyrrolidone and acetonitrile.

4. The preparation method for a zinc powder anode material according to claim 1, wherein in the step of performing ball milling of the mixed solution, ball milling time is 0.1-5 h; and a particle size of ball-milled solid in the mixed solution is less than 500 nm.

5. The preparation method for a zinc powder anode material according to claim 1, wherein the target temperature is 40-50° C., and the target pressure is 7.5-10 MPa.

6. The preparation method for a zinc powder anode material according to claim 5, wherein the preset time is 1-3 h.

* * * * *